(12) United States Patent
Loesenbeck

(10) Patent No.: US 8,901,824 B2
(45) Date of Patent: Dec. 2, 2014

(54) DUAL-SWITCH CURRENT CONVERTER

(75) Inventor: Jan Boris Loesenbeck, Bielefeld (DE)

(73) Assignee: ITT Water & Wastewater Herford GmbH, Herford (DE)

( * ) Notice: Subject to any disclaimer, the term of this patent is extended or adjusted under 35 U.S.C. 154(b) by 9 days.

(21) Appl. No.: 13/812,025

(22) PCT Filed: Jul. 26, 2011

(86) PCT No.: PCT/EP2011/003735
§ 371 (c)(1),
(2), (4) Date: Apr. 16, 2013

(87) PCT Pub. No.: WO2012/013329
PCT Pub. Date: Feb. 2, 2012

(65) Prior Publication Data
US 2013/0221854 A1  Aug. 29, 2013

(30) Foreign Application Priority Data
Jul. 29, 2010  (DE) .......................... 10 2010 032 696

(51) Int. Cl.
| | | |
|---|---|---|
| *H05B 41/16* | (2006.01) | |
| *H02M 7/04* | (2006.01) | |
| *H05B 37/02* | (2006.01) | |
| *H02M 5/293* | (2006.01) | |
| *H05B 41/282* | (2006.01) | |

(52) U.S. Cl.
CPC ................. *H02M 7/04* (2013.01); *H05B 37/02* (2013.01); *H02M 5/293* (2013.01); *H05B 41/2821* (2013.01)
USPC ............................. 315/141; 315/144; 315/274

(58) Field of Classification Search
USPC ......... 315/141, 144, 246, 250, 274, 276, 291, 315/294, 312; 363/126; 323/282
See application file for complete search history.

(56) References Cited

U.S. PATENT DOCUMENTS

| | | | | |
|---|---|---|---|---|
| 4,630,005 A | * | 12/1986 | Clegg et al. ................ | 331/113 A |
| 5,506,766 A | * | 4/1996 | Takahashi ...................... | 363/126 |
| 2003/0053324 A1 | * | 3/2003 | Yamamoto et al. ........... | 363/127 |
| 2005/0156541 A1 | * | 7/2005 | Henze ............................ | 315/312 |
| 2006/0164023 A1 | * | 7/2006 | Siessegger .................... | 315/274 |

FOREIGN PATENT DOCUMENTS

| | | |
|---|---|---|
| AT | 401 591 B | 10/1996 |
| AT | 408 496 B | 12/2001 |

OTHER PUBLICATIONS

International Search Report for PCT/EP2011/003735 mailed Aug. 23, 2012.
IPER and Written Opinion for PCT Application No. PCT/EP2011/003735 mailed Jan. 29, 2013.

* cited by examiner

*Primary Examiner* — Tung X Le
(74) *Attorney, Agent, or Firm* — RatnerPrestia

(57) ABSTRACT

The invention relates to a current converter of the forward converter type for converting a three-phase primary voltage into a plurality of secondary voltages, with a magnetic intermediate circuit including at least three transformer secondary windings, wherein the current converter on its primary side includes at least three transformers with respectively two primary windings wound in opposition directions and respectively at least one secondary winding, and that two electronic switches are provided, wherein the first switch respectively controls a primary winding of the three transformers via a set of diodes and wherein the second switch respectively controls another primary winding of the three transformers via a second set of diodes.

4 Claims, 7 Drawing Sheets

US 8,901,824 B2

DUAL-SWITCH CURRENT CONVERTER

FIELD OF THE INVENTION

The current invention relates to a converter for generating a galvanically separate output voltage of arbitrary magnitude from a three-phase network.

BACKGROUND

Circuits provided with power electronics, which depending on the need can serve as rectifiers, as inverters or to convert alternating voltages of different frequencies into one another, are termed converters.

In the conversion from a three-phase network, for example from the three-phase domestic mains system, converters with six electronic switches are normally used. The employed electronic switches are the most expensive components in a converter circuit. Especially in equipment in which a plurality of electricity consumers have to be controlled via converters, the electronic switches constitute a significant cost factor. An example of the use of such equipment in the public sector is the disinfection of wastewater by means of UV radiation. If low-pressure radiators are used in this case, then in some cases more than 100 converters are necessary for large equipment.

There is therefore a need for inexpensive converters.

From patent specification AT 408 496 B a current converter operating as a rectifier of the isolating transformer-type converter is known, which is constructed with only two power transistors. Owing to the type of construction the efficiency for applications with a high energy requirement is unsatisfactorily low with this current converter.

SUMMARY OF THE INVENTION

An aspect of the present invention is accordingly to provide a current converter of the forward converter type that is inexpensive to manufacture, requires few electronic switches, and preferably can also feed more than one UV-radiator in a suitable manner.

This aspect is achieved by a current converter with the features of claim 1.

Since the current converter is of the forward converter type and comprises three transformers with respectively two primary windings wound in opposite directions and since furthermore two electronic switches are provided that respectively control a primary winding of the three transformers via a set of diodes, then depending on the supply voltage in each of the three transformers a secondary voltage of virtually arbitrary frequency and arbitrary polarity can be generated on the secondary side, in which the magnitude of the generated voltage depends on the transformation ratio of the transformer on the one hand and on the instantaneously applied value of the supply voltage on the other hand. The latter restriction is not important for numerous applications, in particular for the operation of gas-discharge lamps.

In contrast to conventional current converters and rectifiers, the dual-switch current converter can manage with a minimum number of components, but despite this has major advantages as regards network perturbations, efficiency and structural size.

Especially in connection with the operation of a large number of low-pressure radiators in the region of respectively 500 W or the operation of individual medium-pressure radiators in the region of respectively 10 kW, this principle offers major cost advantages.

If the secondary side is designed as a rectifier circuit, relatively large outputs can be achieved with a compact inexpensive construction.

If finally the secondary side of current converters is designed for operating an ozone generator constituting a capacitive load and based on the principle of silent discharge, the generator can be operated very effectively. The electrical losses and the current converter costs are significantly less compared to the operation of ozone generators employing known current converters.

BRIEF DESCRIPTION OF THE DRAWINGS

Exemplary embodiments of the present invention are described hereinafter with the aid of the drawings, in which.

DETAILED DESCRIPTION

Principal Circuit and Function

Figure 1:
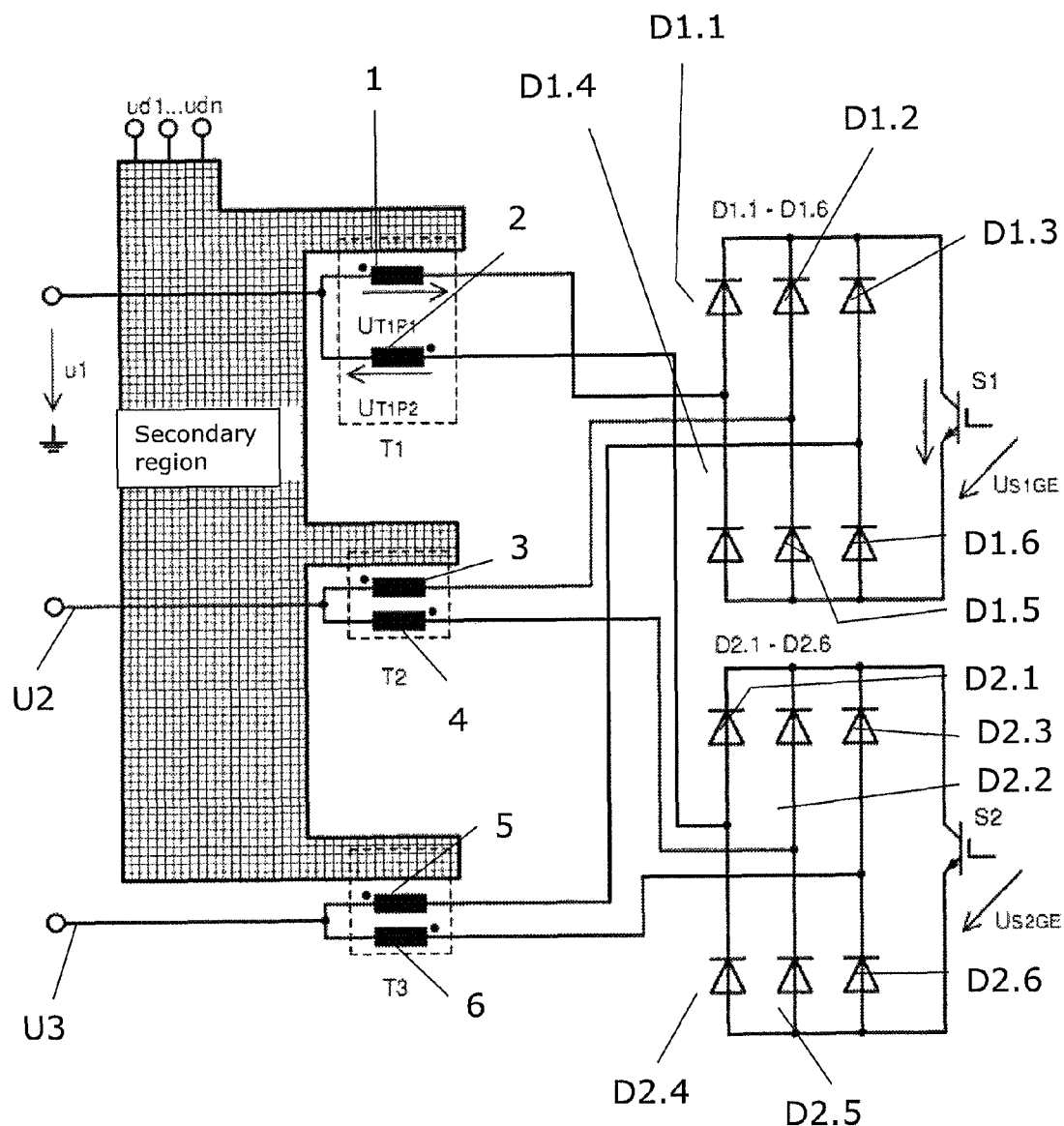
FIG. 1: Shows the principal circuit of the current converter on the primary side.

The principal circuit of the new current converter is illustrated in FIG. 1. The primary side of the current converter is connected to a three-phase input voltage U1, U2 and U3. The secondary region galvanically decoupled via transformers T1, T2 and T3 is shown only as a block. Possible embodiments of the secondary region are described in more detail hereinbelow.

The circuit is now described hereinafter with the example of the path of the input voltage U1. The input voltage U1 is applied to the primary side of the transformer T1. The transformer T1 has a first primary winding 1 and a second primary winding 2. The primary windings 1 and 2 are wound in opposite directions. The start of the winding of the primary winding 1 is connected to the end of the winding of the primary winding 2. The other connection of the primary winding 1 is connected to a pair of diodes D1.1 and D1.4. The diodes D1.1 and D1.4 are in turn connected to the two controlled connections of the switch S1. The primary-side winding 2 of the transformer T1 is connected with the second connection to a second pair of diodes D2.1 and D2.4

The diodes D2.1 and D2.4 are in turn connected to the two switched connections of the switch S2.

The input voltage U2 is correspondingly applied to the transformer T2 on the input side. The transformer T2 also comprises a first primary winding 3 and a second primary winding 4, which is wound in the opposition direction to the first primary winding 3. The first primary winding 3 is connected to the second connection on a pair of diodes D1.2 and D1.5. This pair of diodes is in turn connected to the switched connections of the switch S1. The second winding 4 of the transformer T2 is connected to a pair of diodes D2.2 and D2.5. The diodes are in turn connected to the switched connections of the switch S2.

The third transformer T3 is, like the two previous transformers, provided with a first winding 5 and a second winding 6, wound in the opposition direction. The winding 5 is connected to a pair of diodes D1.3 and D1.6. The transformer 3 is connected with its second winding 6 to a pair of diodes D2.3 and D2.6.

In the primary region the two primary windings wound in opposite directions are respectively connected on the input side to the respective input voltage. On the output side each primary winding is associated with a bridge arm of an uncontrolled B6 bridge. The two uncontrolled B6 bridges are in turn closed on the D.C. side by respectively a switch S, which is here implemented as an IGBT (Insulated Gate Bipolar Transistor).

In the secondary region the three-phase input voltage U1 to U3 can be converted into arbitrarily many galvanically separated output voltages ud1 to udn.

The alternating field required for the power transmission is generated in the transformers T1 to T3 with the aid of the switches S1 and S2 and the diodes D1.1 to D2.6.

Figure 2:
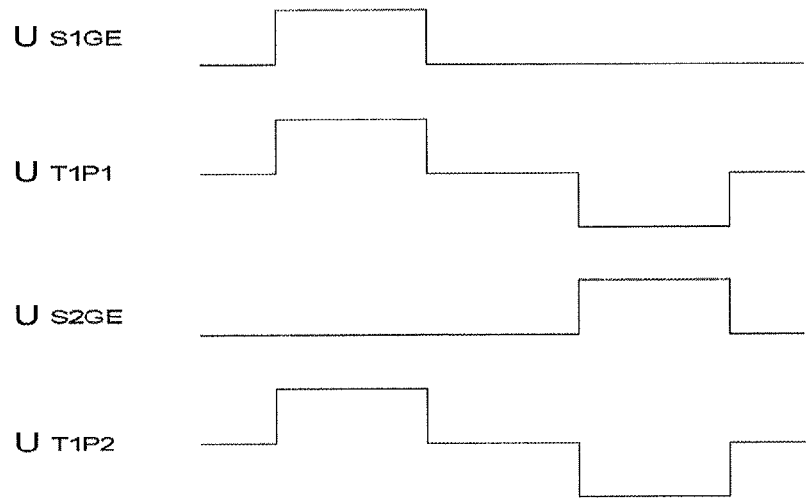
FIG. 2: Shows a possible behaviour of the control signals and of the transformer primary voltage in the circuit according to FIG. 1.

A typical behaviour of the control signals US1GE and US2GE for the switches S1 and S2 and the resulting behaviour of the two transformer primary voltages of the transformer T1 are shown in FIG. 2. The time-displaced control signals control the voltages UT1P1 and UT1P2 applied via the separate primary sides of the transformer T1. This generates the alternating magnetic field, with the aid of which the power is transmitted to the secondary region. The energy flow can be controlled for example with the aid of a pulse width modulation.

Examples of the Implementation of the Secondary Region

Figure 3:
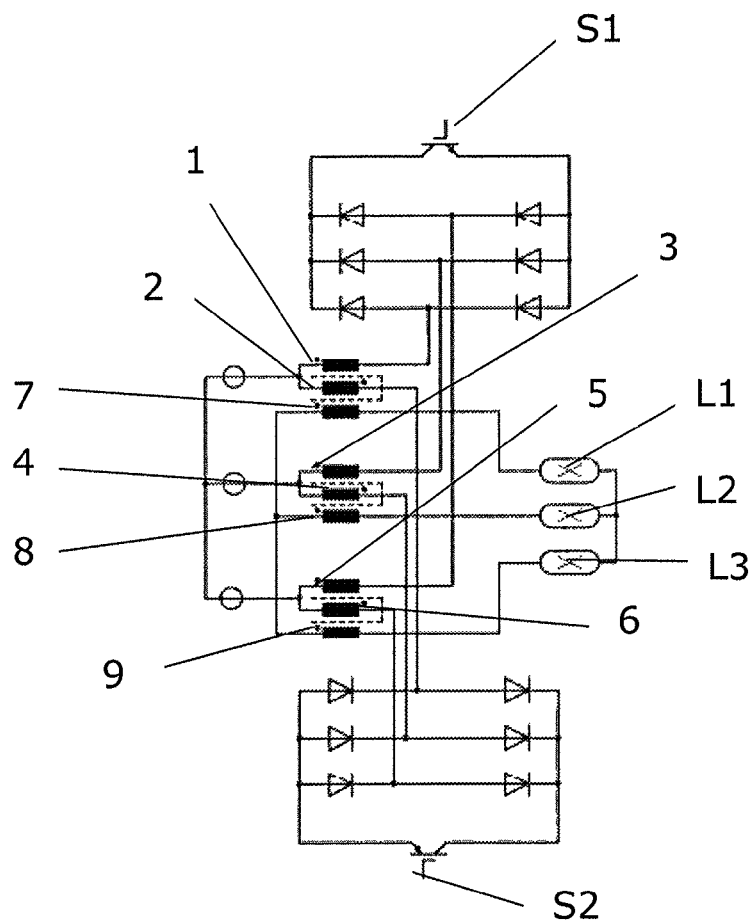
FIG. 3: Shows a circuit of the current converter with a secondary side, which is designed for operating three gas-discharge lamps using the current converter.

The power can be transformed in various ways on the secondary side for further utilisation, for example for supplying three lamps, as is shown in principle in FIG. 3. The three lamps L1, L2 and L3 connected in the form of a star are fed by three secondary windings 7, 8 and 9 likewise connected in the form of a star. FIGS. 6 to 9 show exemplary modifications of the principal circuit of FIG. 3.

Discussion of an Exemplary Embodiment

Figure 4:
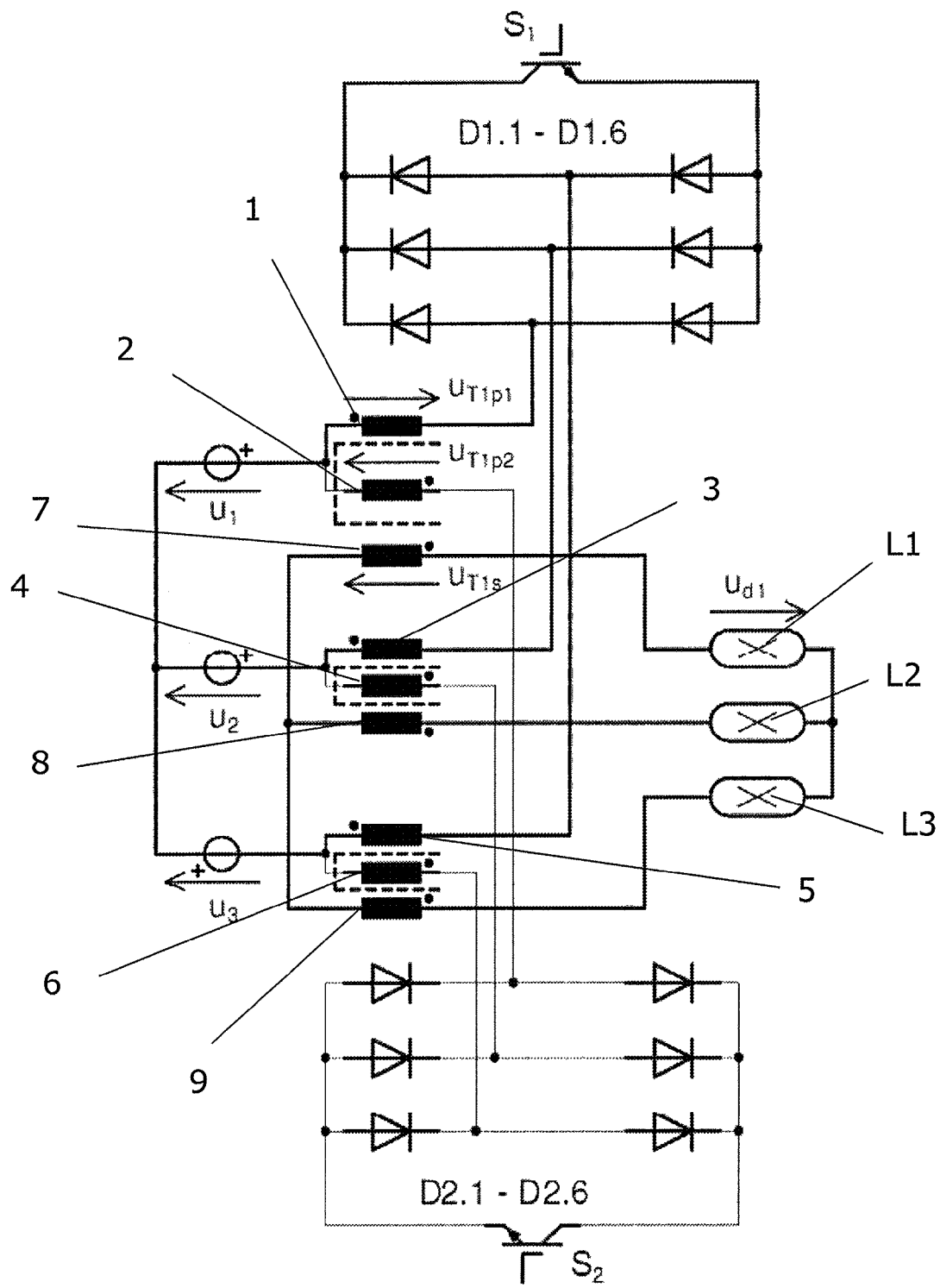
FIG. 4: Shows the circuit according to FIG. 3 in a first switching state.
Figure 5:
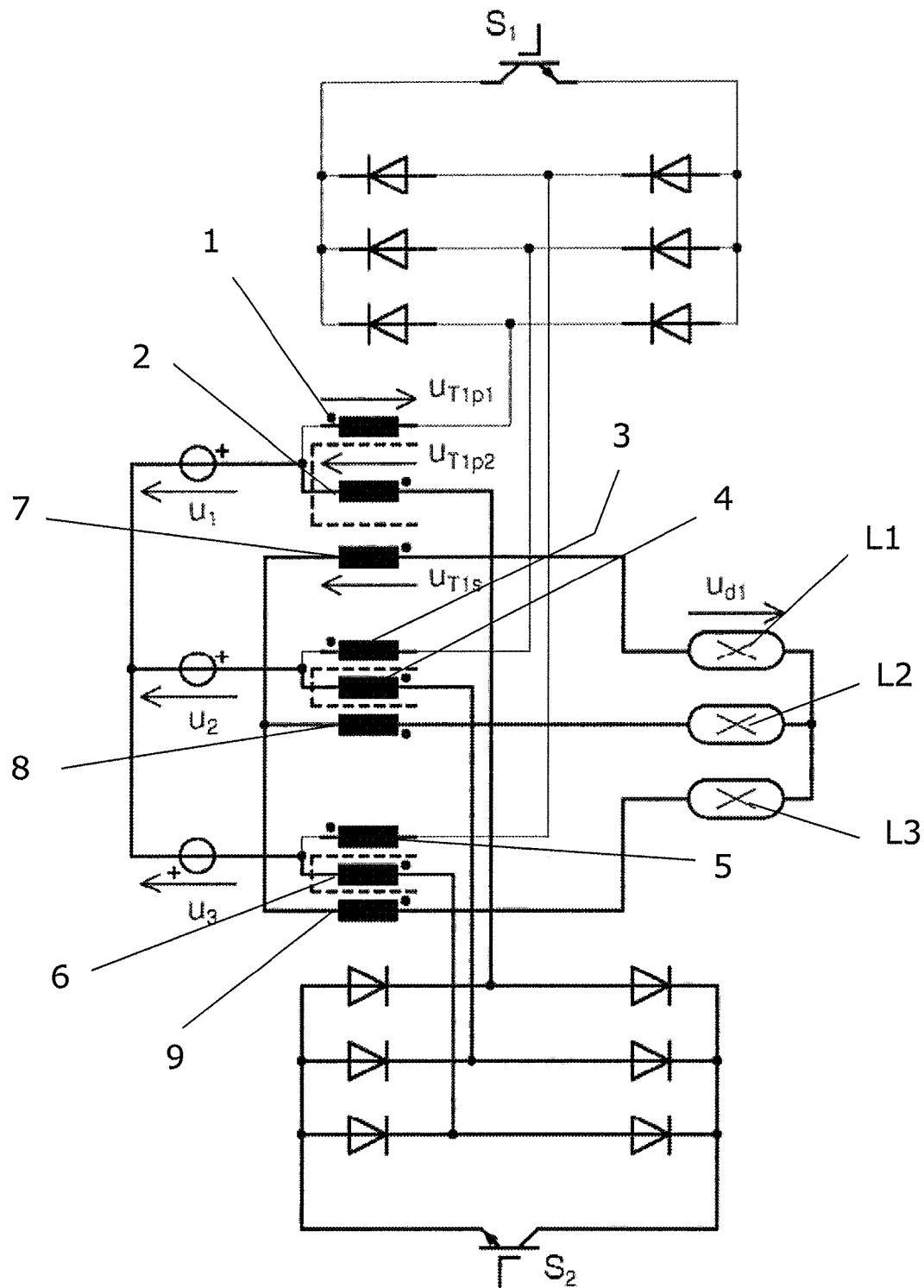
FIG. 5: Shows the circuit according to FIG. 3 in a second switching state.
Figure 6:
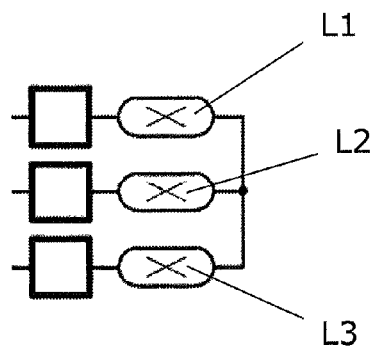
FIG. 6: Show a modification of the circuit according to FIG. 3 that can be used instead of the lamps of FIG. 5, with respectively an ignition device for the gas-discharge lamps.
Figure 7:
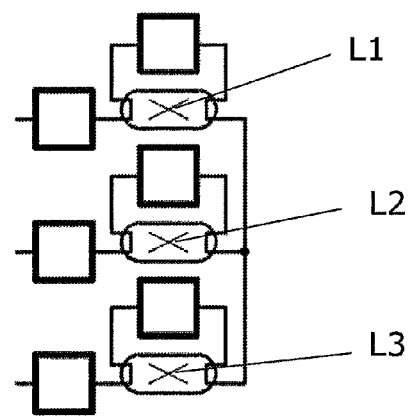
FIG. 7: Shows a modification of the circuit according to FIG. 6 that can be used instead of the lamps of FIG. 5, with respectively an additional heating device for each gas-discharge lamp.
Figure 8:
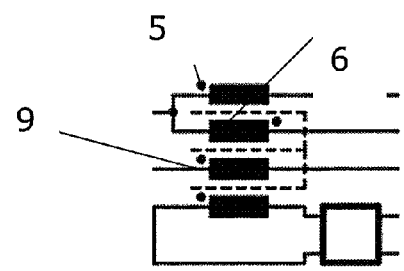
FIG. 8: Shows an example of an embodiment of the secondary region of the transformers, with which a galvanically separate auxiliary power can be generated on the secondary side.
Figure 9:
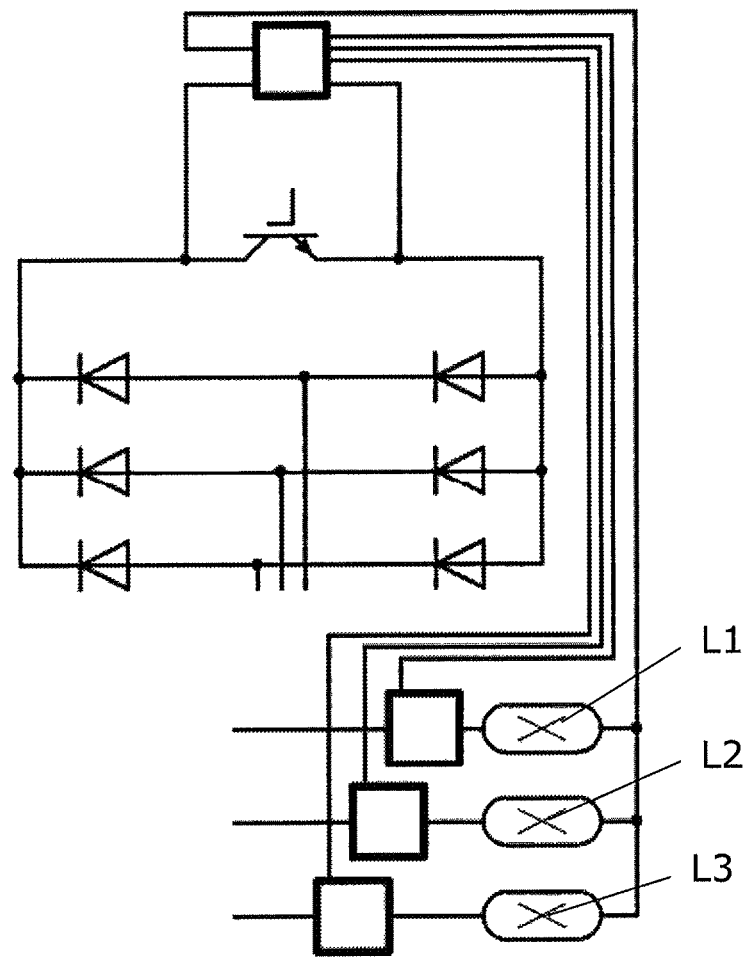
FIG. 9: Shows a circuit for using the voltage of a load shedding network as auxiliary voltage for example for igniting gas-discharge lamps.

FIGS. 4 and 5 show the dual-switch current converter in a circuit for operating three lamps, for example in the preferred use for operating three UV gas-discharge lamps for water or waste water treatment.

In this connection FIG. 4 shows the circuit state a: S1 is switched on, S2 is switched off. FIG. 5 shows the circuit state c: S2 is switched on, S1 is switched off.

In the description of the pulse-frequency switching stages it will be assumed for the sake of simplicity that the network period is very much larger than the pulse period, which is determined by the switching frequency of the switches S1 and S2. This frequency can for example be 1 kHz. Consequently, during a pulse period the network voltages U1 to U3 can be regarded as constant. As an example a point in time within the network period will now be chosen here, in which U1 and U2 are respectively positive and U3 is negative.

Three pulse-frequency switches a, b and c are possible: during the switching stage a the switch S1 should be switched on and the switch S2 should be switched off. During the switching state b both switches should be switched off. In the switching state c finally the switch S1 should be switched off and the switch S2 switched on. Power is transmitted to the secondary sides only during the switching state a illustrated in FIG. 4 and during the switching state c illustrated in FIG. 5. The current-conducting paths in the two Figs. are shown respectively by thick lines for clarification. Zero current paths are shown by thin lines.

Switching State a: S1 Switched On, S2 Switched Off

This switching stage is illustrated in FIG. 4. The closed switch S1 ensures together with the upstream uncontrolled B6 bridge that a symmetrical, three-phase voltage system is formed with UT1P1, UT2P1 and UT3P1 via the respectively first primary winding of the three transformers T1 to T3. This voltage system now appears transformed with UT1s, UT2s and UT3s on the secondary sides of the transformers and forms the symmetrical lamp voltages Ud1, Ud2 and Ud3.

Switching State b: S1 Switched Off, S2 Switched Off

The system is in a zero current state. The lamp voltages therefore have the value zero.

Switching State c: S1 Switched Off, S2 Switched On

This switching state is shown in FIG. 5. Here the switches S1 and S2 have changed roles. Compared to the switching state a, the secondary voltages and thus the lamp voltages now have changed signs.

The order of the switching states is a, b, c, b, a, b, c, .... The secondary voltages uT1s to uT3s can be calculated as follows with (1):

$$\begin{pmatrix} u_{T1s} \\ u_{T2s} \\ u_{T3s} \end{pmatrix} = \quad (1)$$

$$\begin{pmatrix} u_{d1} \\ u_{d2} \\ u_{d3} \end{pmatrix} = \begin{cases} \begin{pmatrix} u_1 \\ u_2 \\ u_3 \end{pmatrix} \frac{n_s}{n_p} & \text{Switching state } a\text{: } S1 \text{ switched on} \\ 0 & \text{Switching state } b\text{: } S1 \text{ and } S2 \text{ switched off} \\ -\begin{pmatrix} u_1 \\ u_2 \\ u_3 \end{pmatrix} \frac{n_s}{n_p} & \text{Switching state } c\text{: } S2 \text{ switched on} \end{cases}$$

where ns/np is the ratio of the number of turns of the secondary winding for each of the two primary windings. The secondary voltages are equal to the respective lamp voltages ud1 to ud3.

Figure 10:
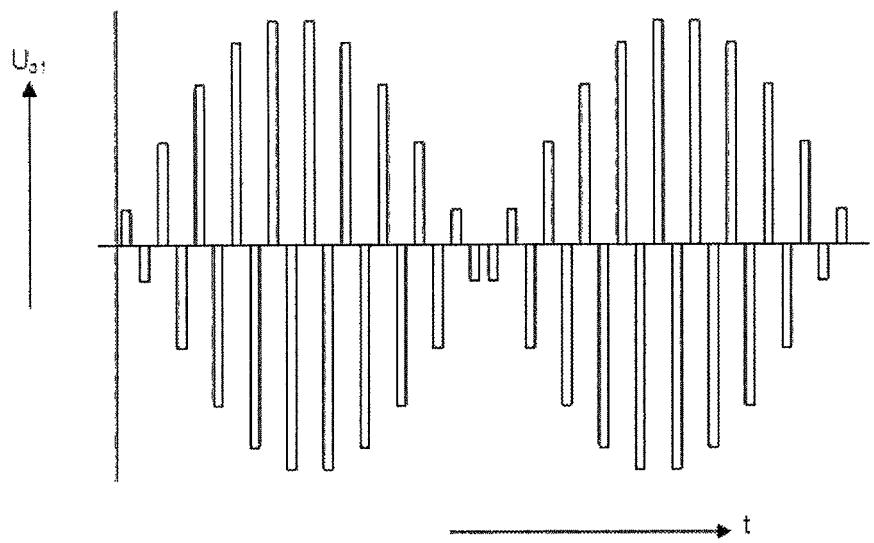
FIG. 10: Shows the lamp voltage ud1 of the current converter according to FIG. 3 for one network period.

In FIG. 10 the lamp voltage ud1 of the dual-switch current converter according to FIG. 3 is shown for a network period. It consists of pulse-frequency blocks with respectively a positive block and a negative block per pulse period. The contribution of the peak value of the respective block is, with the ratio ns/np, proportional to the contribution of the network voltage applied to the phase.

Figure 11:
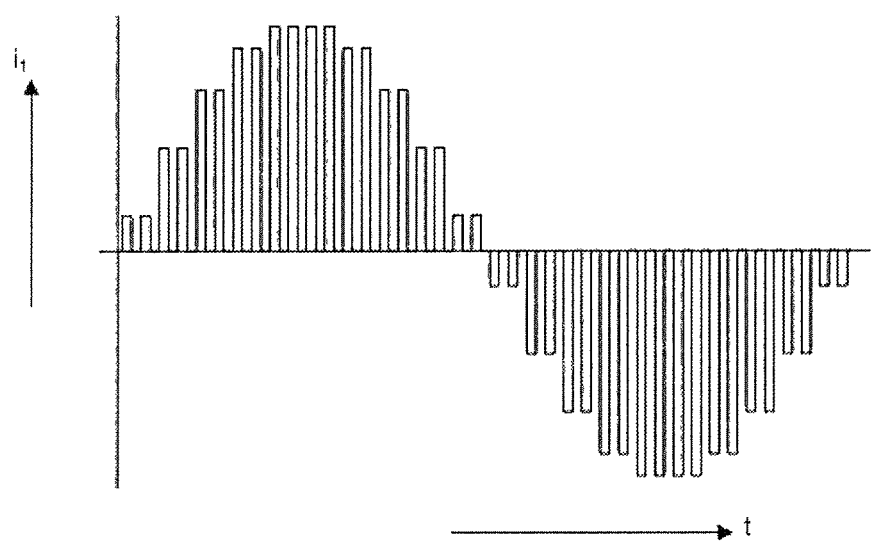
FIG. 11: Shows the network current of the current converter according to FIG. 3.

The network current of the dual-switch current converter according to FIG. 3 is illustrated in FIG. 11. It corresponds to the respective transformer primary current Er and consists of pulse-frequency blocks with two equal-pole blocks per pulse period. The peak value of a block is proportional to the network voltage applied to the phase.

The invention claimed is:

1. A current converter of the forward converter type for converting a three-phase primary voltage into a plurality of secondary voltages, the converter comprises at least three transformer secondary windings, wherein the current converter on the primary side comprises at least three transformers with respectively two primary windings wound in opposite directions and respectively at least one secondary winding, and two electronic switches are provided, wherein the first switch respectively controls a primary winding of the three transformers via a set of diodes and wherein the second switch respectively controls another primary winding of the three transformers via a second set of diodes.

2. Current converter according to claim 1, wherein the secondary side is designed for operating three UV gas-discharge lamps of identical construction in a star connection.

3. Current converter according to claim 1, wherein the secondary side is designed as a rectifier circuit.

4. Current converter according to claim 1, wherein the secondary side is designed for operating an ozone generator based on the principle of silent discharge.

\* \* \* \* \*